(12) United States Patent
Safran et al.

(10) Patent No.: US 7,624,657 B2
(45) Date of Patent: Dec. 1, 2009

(54) MOTOR-DRIVEN ACTUATOR

(75) Inventors: Les Safran, Westlake, OH (US);
Stephen L. Douglass, Newbury, OH (US)

(73) Assignee: Thermotion Corporation, Mentor, OH (US)

( * ) Notice: Subject to any disclaimer, the term of this patent is extended or adjusted under 35 U.S.C. 154(b) by 492 days.

(21) Appl. No.: 11/484,648

(22) Filed: Jul. 12, 2006

(65) Prior Publication Data

US 2008/0011113 A1  Jan. 17, 2008

(51) Int. Cl.
*F16H 29/20* (2006.01)
*F16H 19/04* (2006.01)

(52) U.S. Cl. .......................................... 74/89.17; 74/29

(58) Field of Classification Search ................ 74/89.14, 74/89.17, 89.16, 89.19, 89.11, 130, 132, 74/135, 422, 421 R, 421 A, 424.6, 425, 25, 74/29; 185/37

See application file for complete search history.

(56) References Cited

U.S. PATENT DOCUMENTS

| | | | | |
|---|---|---|---|---|
| 455,009 | A * | 6/1891 | Shoudy | 74/132 |
| 1,356,297 | A * | 10/1920 | Lochner | 74/56 |
| 3,174,353 | A * | 3/1965 | Gross | 74/413 |
| 4,190,081 | A | 2/1980 | Coles | |
| 4,720,898 | A | 1/1988 | Calfo et al. | |
| 5,216,396 | A * | 6/1993 | Stahly | 335/80 |
| 5,788,008 | A * | 8/1998 | Fort et al. | 180/247 |
| 5,932,997 | A | 8/1999 | James | |
| 6,318,196 | B1 * | 11/2001 | Chang | 74/89.12 |
| 6,990,873 | B2 * | 1/2006 | Rennen et al. | 74/421 A |
| 7,252,618 | B2 * | 8/2007 | Spakowski et al. | 475/343 |
| 2005/0218311 | A1 * | 10/2005 | Campany et al. | 250/231.13 |

FOREIGN PATENT DOCUMENTS

EP  0 165 735  12/1985

* cited by examiner

*Primary Examiner*—Thomas R Hannon
*Assistant Examiner*—James Pilkington
(74) *Attorney, Agent, or Firm*—Leydig, Voit & Mayer, Ltd.

(57) ABSTRACT

A motor-driven actuator extends and retracts a piston rod. The actuator includes a housing, an electric motor having a motor shaft, a piston rod slidably extendable and retractable with respect to the housing, a speed-reduction stage coupled to the motor shaft and rotating a drive shaft parallel to the motor shaft, a speed and direction-change stage coupled to and driven by the drive shaft and rotating a wheel gear substantially perpendicular to the motor shaft, and a driving stage coupled to and driven by the wheel gear and extending and retracting the piston rod relative to the housing along a direction parallel to the motor shaft. The actuator also includes a position detector detecting when the piston rod is in the extended and retracted positions. Preferably, the position detector includes Hall effect sensors and a permanent magnet mounted on a piston driving the piston rod.

19 Claims, 9 Drawing Sheets

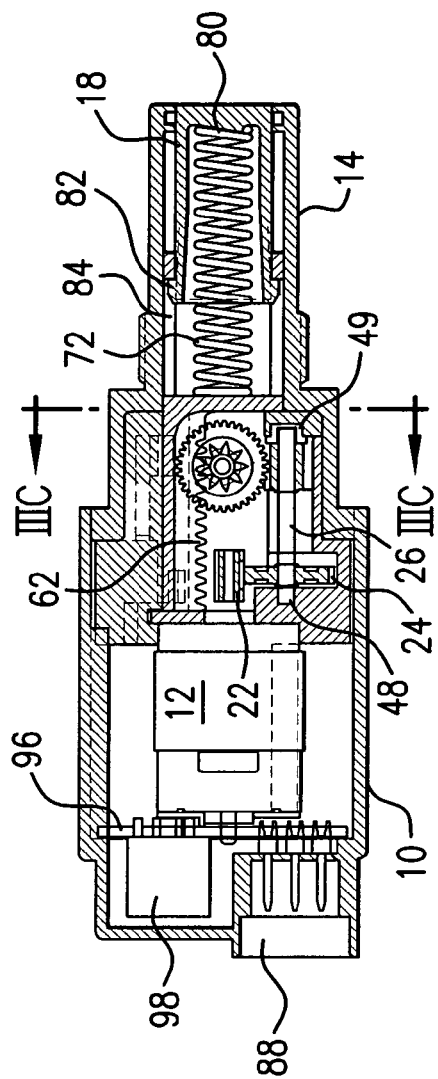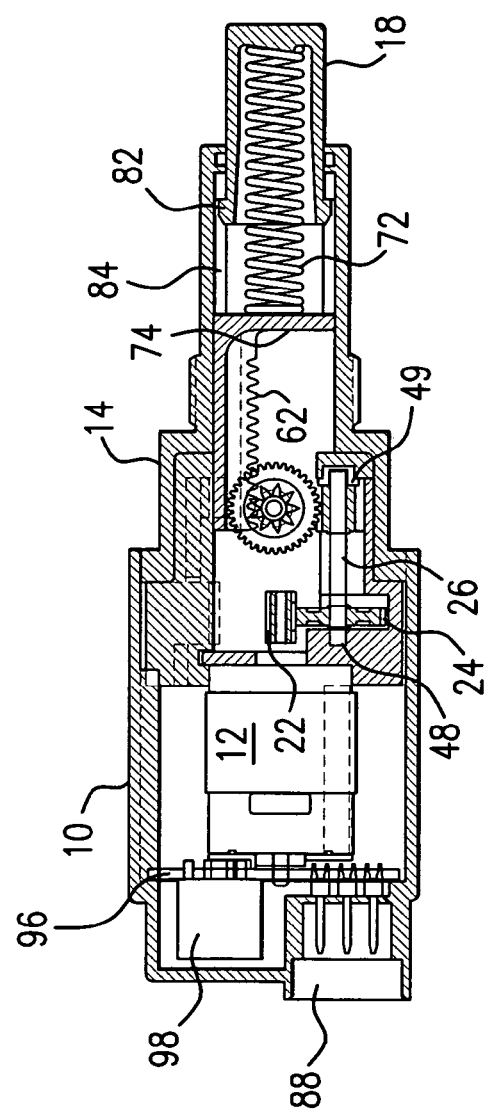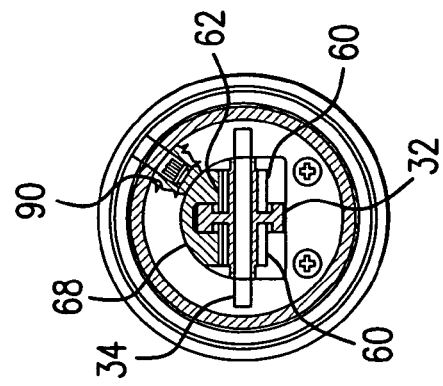

MOTOR-DRIVEN ACTUATOR

FIELD OF THE INVENTION

The present invention pertains to electrically driven actuators in which a electric motor provides motive power extending a piston rod from a housing and retracting the piston rod relative to the housing in response to electrical current supplied to the electric motor.

BACKGROUND

Mechanical actuators providing movement of a mechanical element in response to an electrical current supplied to a motor are known in various forms. A typical actuator of this type includes a lead screw rotated by an electrical motor. Because of the typical rotational speed of the electric motor, a speed reduction mechanism is interposed between the electric motor and the lead screw. The lead screw engages a threaded element that moves along the lead screw as the lead screw is rotated by the motive force of the electric motor. While such actuators employ a relatively simple design, they lack flexibility. These actuators typically determine the full extension and full retraction of the piston rod using a sliding electrical contact, effectively counting the number of turns of the lead screw. This technique for detecting the full extension and full retraction in order to terminate current flow to the electric motor is subject to wear, vibration, and corrosion.

SUMMARY OF THE INVENTION

In order to overcome the disadvantages of the prior art, a motor-driven actuator according to the invention does not employ a lead screw and provides positive identification of the full extension and full retraction of a piston rod without using any sliding electrical contacts.

An actuator according to the invention includes a housing, an electric motor contained within the housing and having a motor shaft rotating about an axis, a piston rod slidably extendable and retractable with respect to the housing, a speed-reduction stage including speed reducing gears and a drive shaft coupled by the speed reducing gears to the motor shaft and rotating the drive shaft along an axis parallel to the axis of the motor shaft upon rotation of the motor shaft, a speed and direction-change stage coupled to and driven by the drive shaft and rotating a wheel gear about an axis substantially perpendicular to the axis of the motor shaft, and a driving stage coupled to and driven by the wheel gear and extending and retracting the piston rod relative to the housing about a direction parallel to the axis of the motor shaft.

In a preferred embodiment, the speed-reduction stage includes a gear fixedly mounted on the motor shaft and a spur gear mounted on the drive shaft, engaging and driven by the gear mounted on the motor shaft. A speed and direction-change stage includes a worm gear fixedly mounted on the drive shaft and a rotating wheel gear engaging the worm gear. In a preferred embodiment, the driving stage includes a pinion fixedly mounted to the wheel gear, and a piston resiliently coupled to the piston rod and including a rack engaging the pinion for extending and retracting the piston rod along a direction parallel to the axis of the motor shaft, upon rotation of the wheel gear.

In an actuator according to the invention, a position detector detects when the piston rod is in an extended position and when the piston rod is in a retracted position. The position detector may include first and second Hall effect sensors fixedly mounted within the housing and a permanent magnet mounted on the piston, the permanent magnet being opposite the first and second Hall effect sensors in the extended position of the piston rod and the retracted position of the piston rod, respectively. This position detector does not employ any sliding contacts susceptible to wear, vibration, corrosion, or contamination.

BRIEF DESCRIPTION OF DRAWING FIGURES

FIGS. 3A and 3B are cross-sectional views corresponding to FIGS. 1 and 2, sectioned by planes containing the axes of rotation of the motor shaft and of a shaft driven by the motor shaft; and FIG. 3C is a cross-sectional view transverse to the motor shaft taken along line IIIC-IIIC of FIG. 3A.

FIGS. 5A and 5B are perspective views of internal parts of the actuator embodiment of FIGS. 1 and 2, illustrating elements of a position detector in which FIG. 5A is a partially exploded view and FIG. 5B is an assembled view, with one part indicated in phantom lines.

In all figures, the same reference numbers are employed to designate the same elements to minimize duplication of description of the actuator embodiment illustrated.

DETAILED DESCRIPTION

Figure 1:
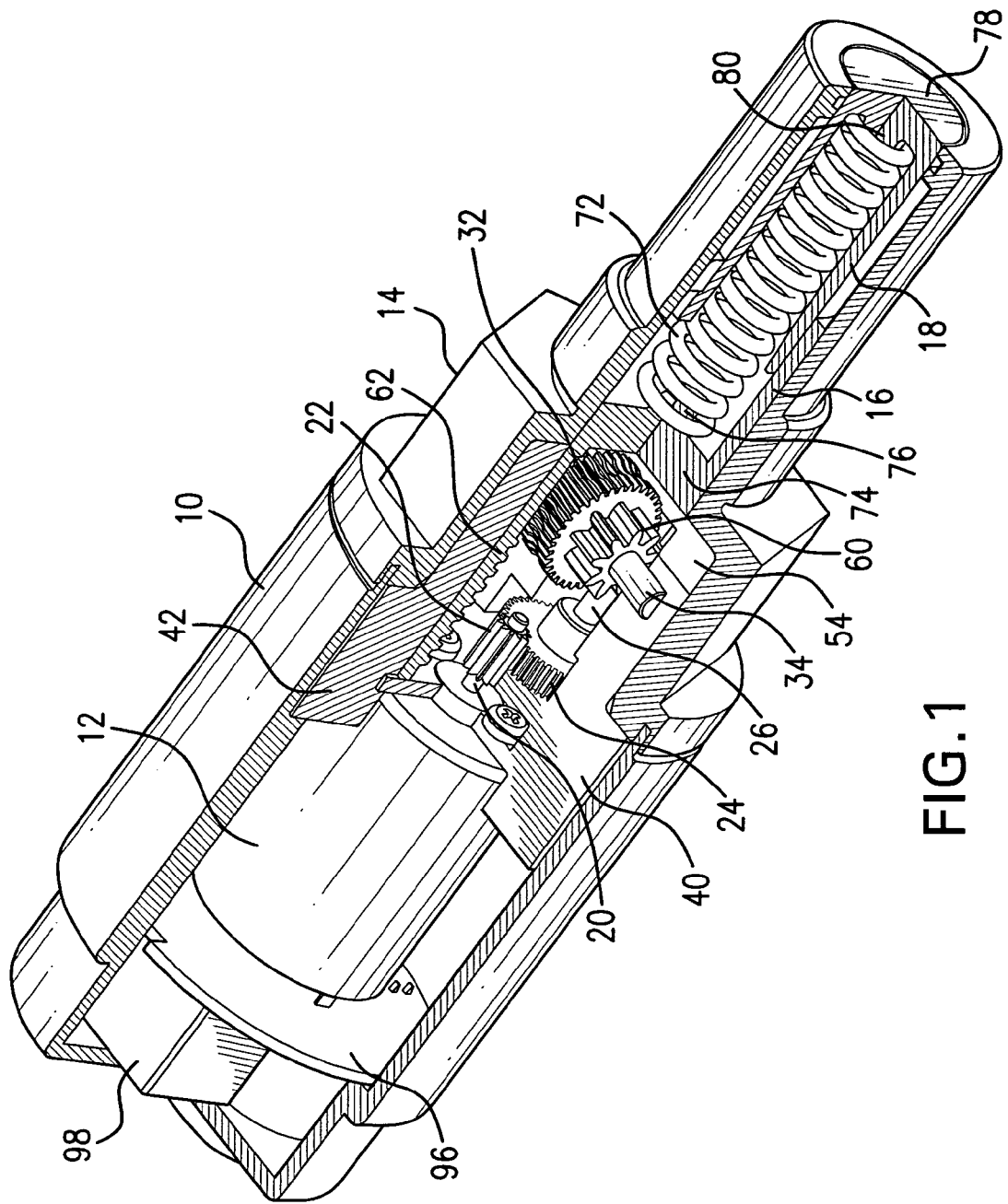
FIG. 1 is a perspective, partially cut-away view of a motor-driven actuator according to an embodiment of the invention with the piston rod fully retracted.

An embodiment of a motor-driven actuator according to the invention is illustrated in FIGS. 1, 3A, 3B, and 6 and some parts of that actuator are illustrated in FIGS. 3C, 4A, 4B, 5A, and 5B. The actuator includes an external housing having a rear part 10 containing an electric motor 12. A front part 14 of the external housing is joined to the rear part 10 and contains, among other parts, a piston 16 and a piston rod 18 that may be extended from and retract into the front part 14 of the housing. Typically, the electrical motor 12 is a direct current motor that can be reversed in the direction of rotation of a shaft 20 by reversing the polarity of an electrical current supplied to the motor. Preferably, the rear part housing 10 includes, opposite the motor 12, internal surfaces complementary to the external shape of the motor 12. The rear part housing 10 holds the motor and the remainder of the internal parts of the actuator, described below, in place within the actuator. Most preferably, the rear part 10 and the front part 14 of the housing are plastic materials that can be easily molded to have surfaces with complex shapes.

Three stages of mechanical interconnections transfer the rotation of the motor shaft 20 of the motor 12 to the piston rod 18. The first stage, a speed-reducing stage, includes a gear 22 coaxially and fixedly mounted on the motor shaft 20. The gear 22 engages a spur gear 24 fixedly mounted on a drive shaft 26 that has an axis of rotation parallel to, but offset from, the axis of the motor shaft 20. Because the spur gear 24 has a larger number of teeth and a larger diameter than the gear 22, the drive shaft 26 rotates at a slower speed than the motor shaft 20, providing speed reduction.

The second stage for coupling the motor 12 to the piston rod 18 is a speed and direction-change stage that changes the rotational direction provided by the motor shaft 20 from a direction parallel to the axis of the motor shaft 20 to a direction substantially perpendicular to that axis of the motor shaft 20. The second stage includes a worm gear 30 fixedly mounted on the drive shaft 26, the shaft on which the spur gear 24 is fixedly mounted. The worm gear 30 engages and drives a wheel gear 32 that is preferably rotationally mounted on a stationary transverse shaft 34. The rotation of the drive shaft 26, turning the worm gear 30, rotates the wheel gear 32. The rotation of the wheel gear 32 is about an axis substantially perpendicular to the axis of the motor shaft 20. As an alternative to the preferred embodiment, the transverse shaft 34 may rotate about its axis and the wheel gear may be fixedly mounted on the transverse shaft.

Figure 4A:
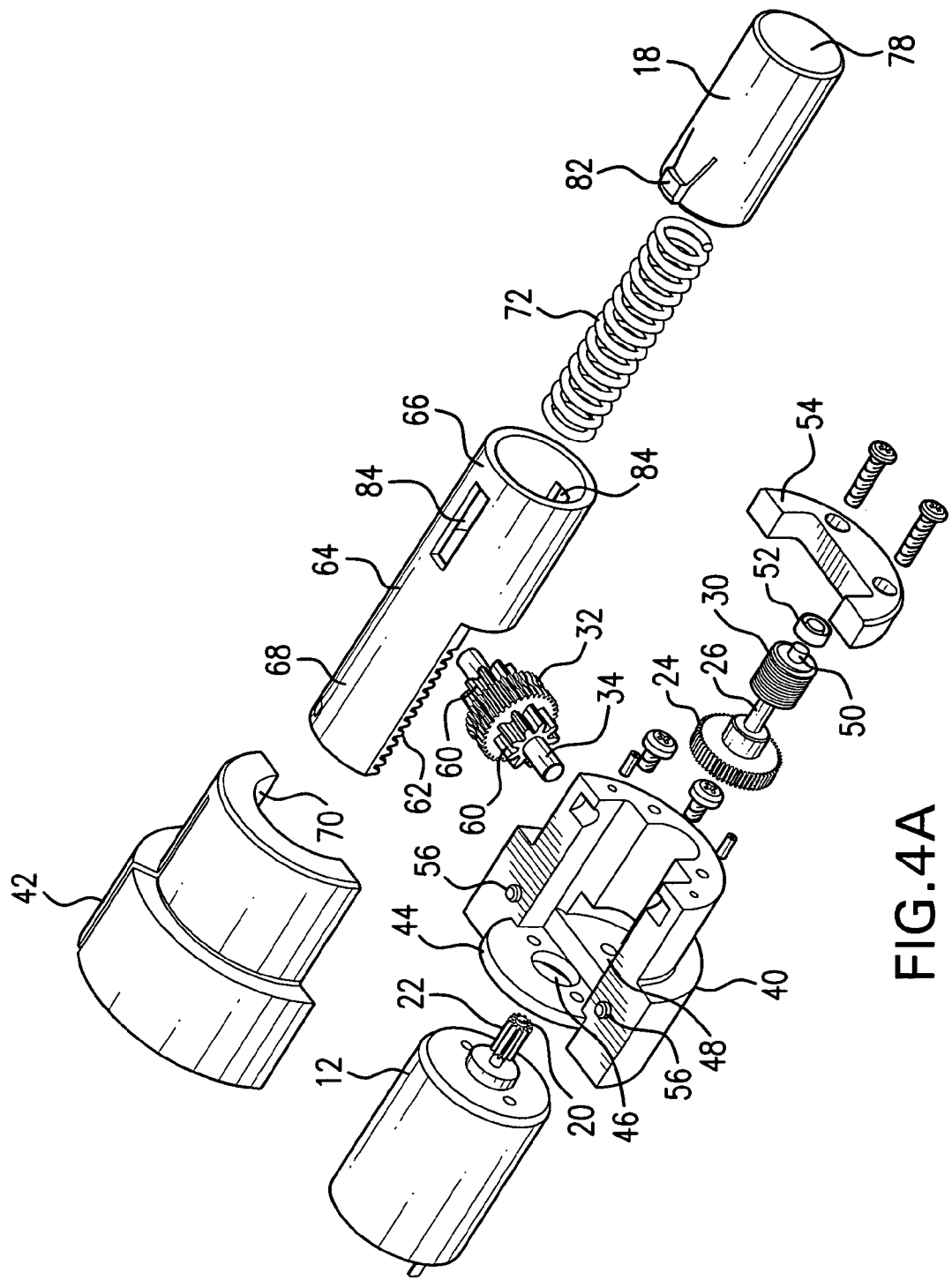
FIGS. 4A and 4B are exploded and partially assembled views, respectively, of some of the parts of the actuator embodiment illustrated in FIGS. 1 and 2.
Figure 4B:
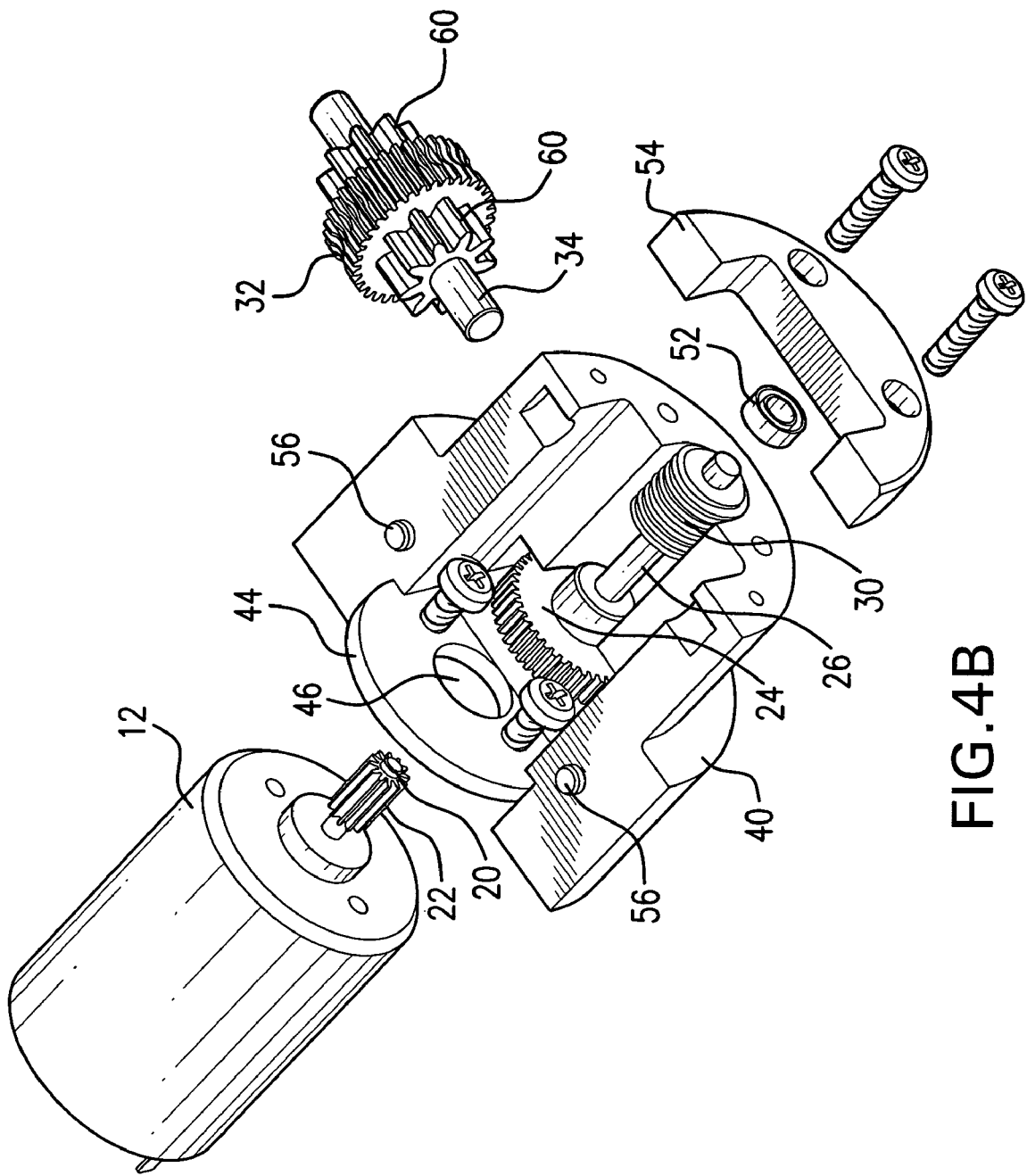

As most easily understood with respect to FIGS. 4A and 4B, the drive shaft 26, the spur gear 24, the worm gear 30, and the wheel gear 32, are supported for their respective rotations and the transverse shaft 34 is fixedly supported by an internal housing including lower and upper internal housing portions 40 and 42. While the spur gear 24, the drive shaft 26, and the worm gear 30 are described as separate elements because of their respective functions, one of skill in the art recognizes that these elements may all be part of a single unitary piece of material, such as a molded plastic. Preferably, the internal housing portions 40 and 42 are molded plastic because they include relatively complex shapes. The lower internal housing portion 40 includes a projecting washer-like structure 44 having a central opening 46 through which the motor shaft 20 and the first gear 22 extend for engagement with the spur gear 24. As shown in FIGS. 4A and 4B, the motor 12 is preferably attached to the washer-like structure 44, for example, with machine screws. A first projecting end of the drive shaft 26 is rotationally received within a recess 48 of the lower internal housing portion 40 that is visible in FIGS. 3A and 3B. A second projecting end of the drive shaft 26, extending from the worm gear 30, is rotationally received within a bearing 52 that, in turn, is received within a recess 49, visible in FIGS. 3A and 3B, of an end piece 54 that is mounted on an end of the lower internal housing portion 40. As illustrated in the figures, the end piece 54 may be attached to the lower internal housing portion 40 with screws that engage that lower internal housing portion 40. Projecting guide pins 56 engage complementary recesses, which are not visible in the figures, in the upper internal housing portion 42. Similar complementary recesses and projections on the lower internal housing portion 40 and the end piece 54 assist in assembly of the end piece 54 to the lower internal housing.

The third stage, the driving stage, drives the piston rod 18, to extend and retract. Two pinions 60 are fixedly mounted on the wheel gear 32, sandwiching the wheel gear 32. The pinions 60 and the wheel gear 32 are rotationally mounted on that transverse shaft. Most preferably, the wheel gear 32 and the pair of pinions 60 are a unitary body, for example, a single piece of molded plastic. If, in an alternative embodiment, the transverse shaft 34 is rotationally mounted and the wheel gear 32 and pinion 60 are fixedly mounted on the transverse shaft 34, then all of those elements may be a single piece of molded plastic. As best seen in FIGS. 3A and 3C, the pinion gears engage and drive respective racks 62 of a piston 64. The piston 64 has a complex shape including a front tubular portion 66 and from which a rear portion 68 of the piston projects. That rear portion 68 includes only a limited circumferential portion of the tube of the tubular portion 66. That rear portion 68 includes two substantially identical racks 62, preferably symmetrically located relative to the central axis of the tubular portion 66. The racks 62 engage and are driven by the respective pinion gears 60. The upper internal housing portion 42 includes a concave internal surface 70 complementary in shape to the rear portion 68 of the piston 64. The piston 64 moves parallel to the axis of the motor shaft 20, as described below. The third, driving stage of the actuator comprises the pinion gear 60, the rack 62, and the piston 64. This third stage may provide further speed reduction depending on the gearing ratio and relative diameters of the wheel gear 32 and pinions 60.

Figure 2:
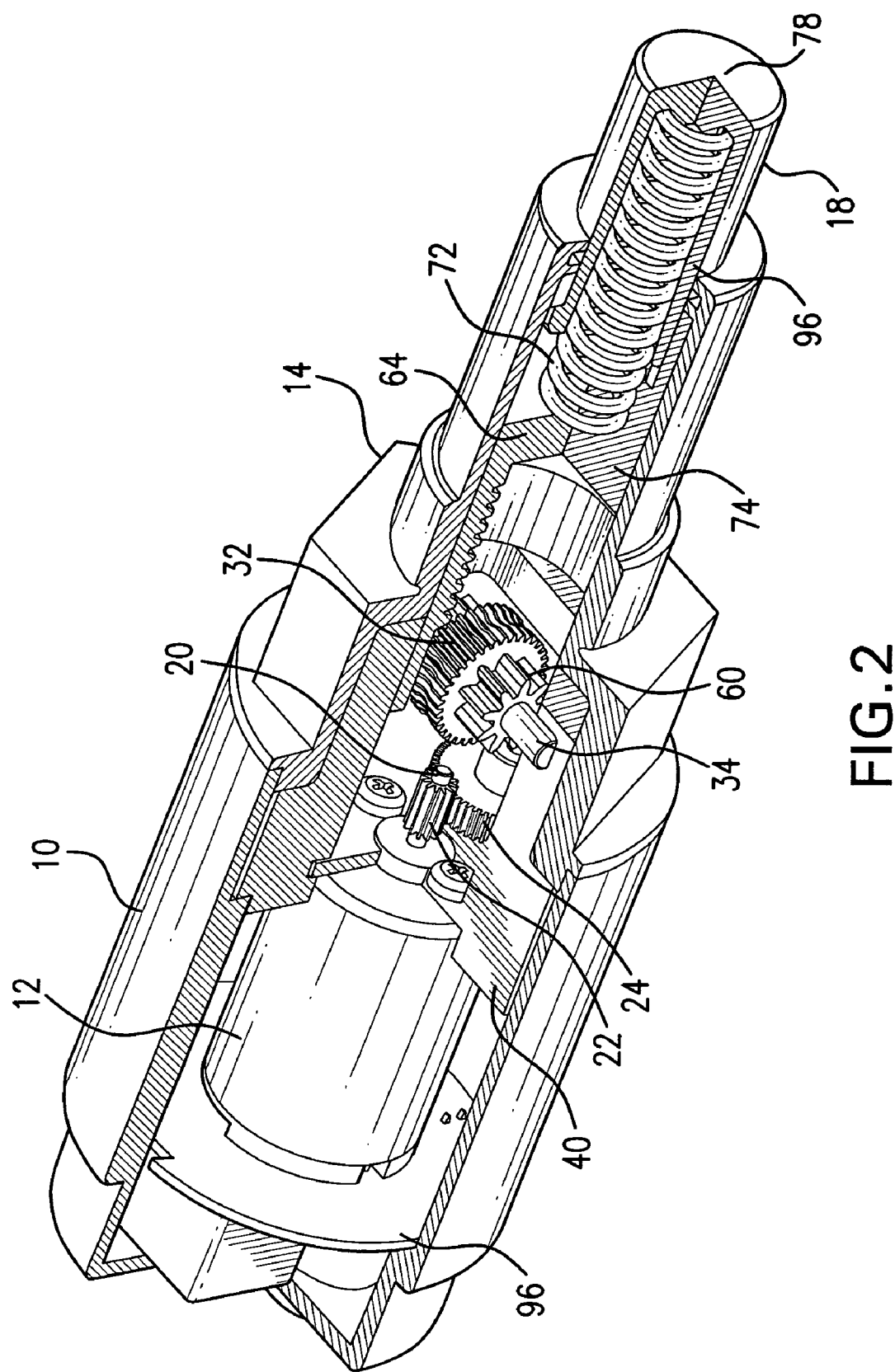
FIG. 2 is a perspective, partially cut-away view of the actuator of FIG. 1 with the piston rod fully extended.

The piston 64 engages and drives the piston rod 18. A coil spring 72 is interposed between the piston 64 and the piston rod 18. Within the piston 64, an end wall 74 (see FIGS. 1, 2, 3A, and 3B) of the tubular portion 66 includes a central projection 76. One end of the coil spring 72 bears on the end wall 74 and is held in place by the projection 76 which is received within the coil spring 72. The opposite end of the coil spring 72 is received within the tubular piston rod 18 and bears upon an end wall 78 of the piston rod 18. A central projection 80 on the interior part of the end wall 78 is received within the end of the coil spring 72 that is within the piston rod 18 to maintain the placement of the coil spring. The coil spring 72 permits resilient coupling of the piston 64 and the piston rod 18. The coil spring urges the piston 64 and the piston rod 70 apart. The resilient coupling of the piston 64 and the piston rod 70 permits sliding of the two elements relative to each other while maintaining the coupling of the two elements. The means of coupling the piston rod 18 to the piston 64 also comprises two resilient projecting tongues 82 at diametrically opposed positions at the open end of the piston rod 18. These tongues are sprung outwardly from the central axis of the piston rod 18. The tongues 82 are received in respective complementary slots 84 in the tubular part 66 of the piston 64. The slots 84 extend axially in the tubular portion 66 of the piston 64. Normally, the coil spring 72 is only lightly compressed when the piston rod 18 is coupled to the piston 64. In that position, projections at the ends of the tongues 82 engage end surfaces of the slots 84, for example, as illustrated in FIG. 1. Particularly when the piston rod is extended, as illustrated in FIG. 2, if an axial force is applied to the end 78 of the piston rod 18 in the direction of the motor 12, the spring 72 is compressed and the tongues 82 slide within the slots 84 in the direction of the motor 12. This resiliency avoids damage to the actuator when the piston rod unexpectedly encounters an obstruction while being extended.

The basic operation of the motor-driven actuator is easily understood. Beginning with the condition illustrated in FIG. 1, i.e., the retracted position of the piston rod 18, an electrical current may be supplied to the motor 12, causing the shaft 20 and the gear 22 to rotate. The gear 20 then drives the spur gear 24, which, in turn, rotates the worm gear 30 at a lower rotational rate than the speed of the motor 12. The rotation of the worm gear 30 drives the wheel gear 32 and that rotation is transmitted, with another potential speed reduction, to the pinions 60. The pinions 60 are engaged with respective racks 62 so that the rotation of the pinions 60 in the clockwise direction, as illustrated in FIGS. 4A and 4B, moves the piston 64 toward the right in those figures. The rear portion 68 of the piston 64 slides along the interior surface of the upper internal housing portion 42. The piston 64 pushes the piston rod 18, with the assistance of the force transmitted through the spring 72, to the right in those figures. The result of that action is the extension of the piston rod 18 to the extended position as shown in FIG. 2. In the reverse operation, the electric current supplied to the motor 12 is reversed in polarity so that the same actions take place but with the shafts 20 and 26, and the wheel gear 32 rotating in reverse directions. As seen by comparison of FIG. 3B, with the piston rod 18 extended, to FIG. 3A, with the piston rod retracted, the piston 64 moves from a second position shown in FIG. 3B to a first position shown in FIG. 3A. In that movement, the two tongues 82 on the piston rod 18, disposed in the respective slots 84 of the piston 64, engage the piston 64 in those slots 84. The movement of the piston 64 from the second position shown in FIG. 3B to the first position shown in FIG. 3A thereby pulls on the piston rod 18 so the piston rod 18 is retracted toward and into the front housing part 14. No lead screw is employed in this actuator or in its operation so that the spring 72 is used to push the piston rod 18 to the extended position and the tongues 82, in cooperation with the slots 84, are employed to pull the piston rod 18 to the retracted position.

Figure 5A:
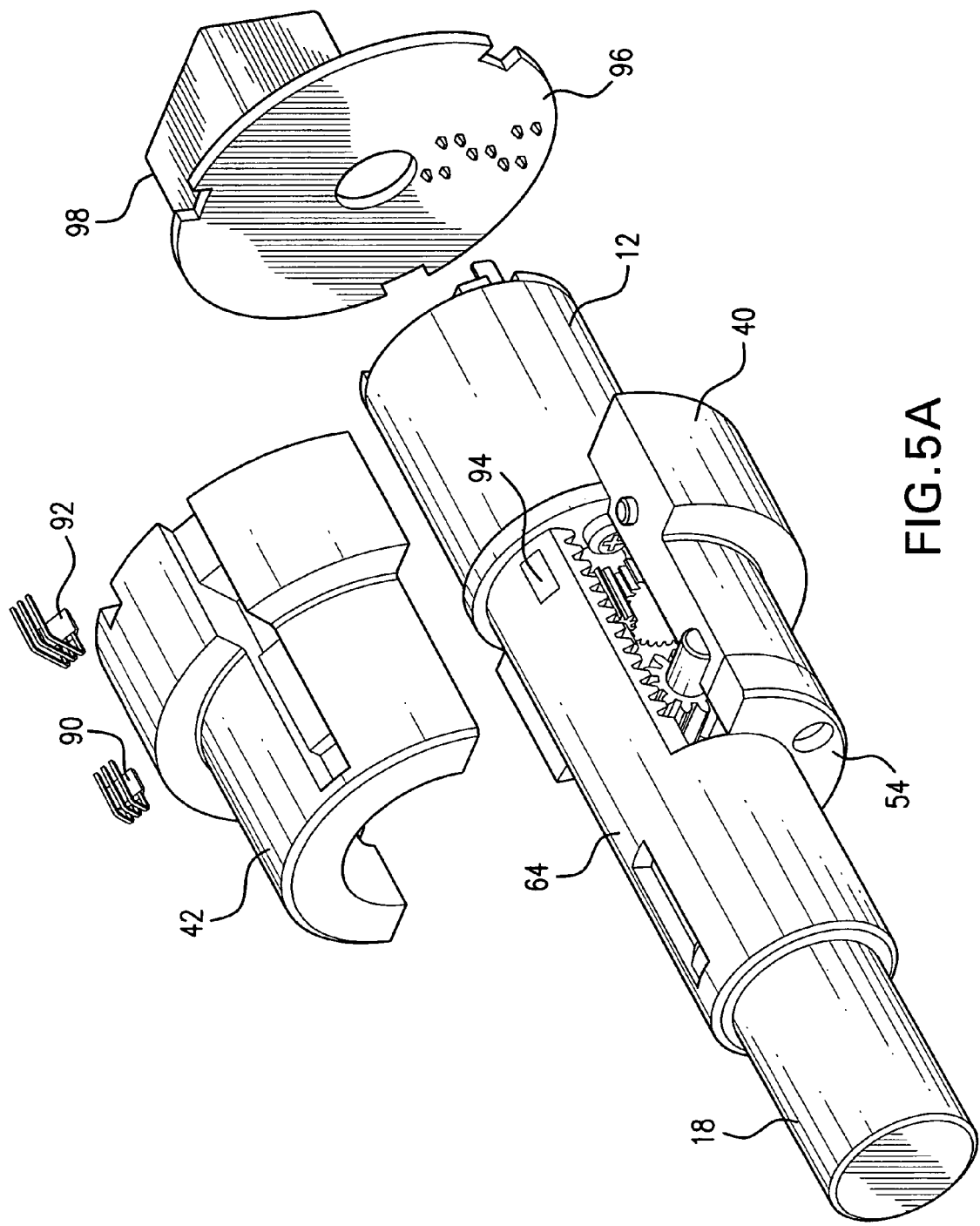
Figure 5B:
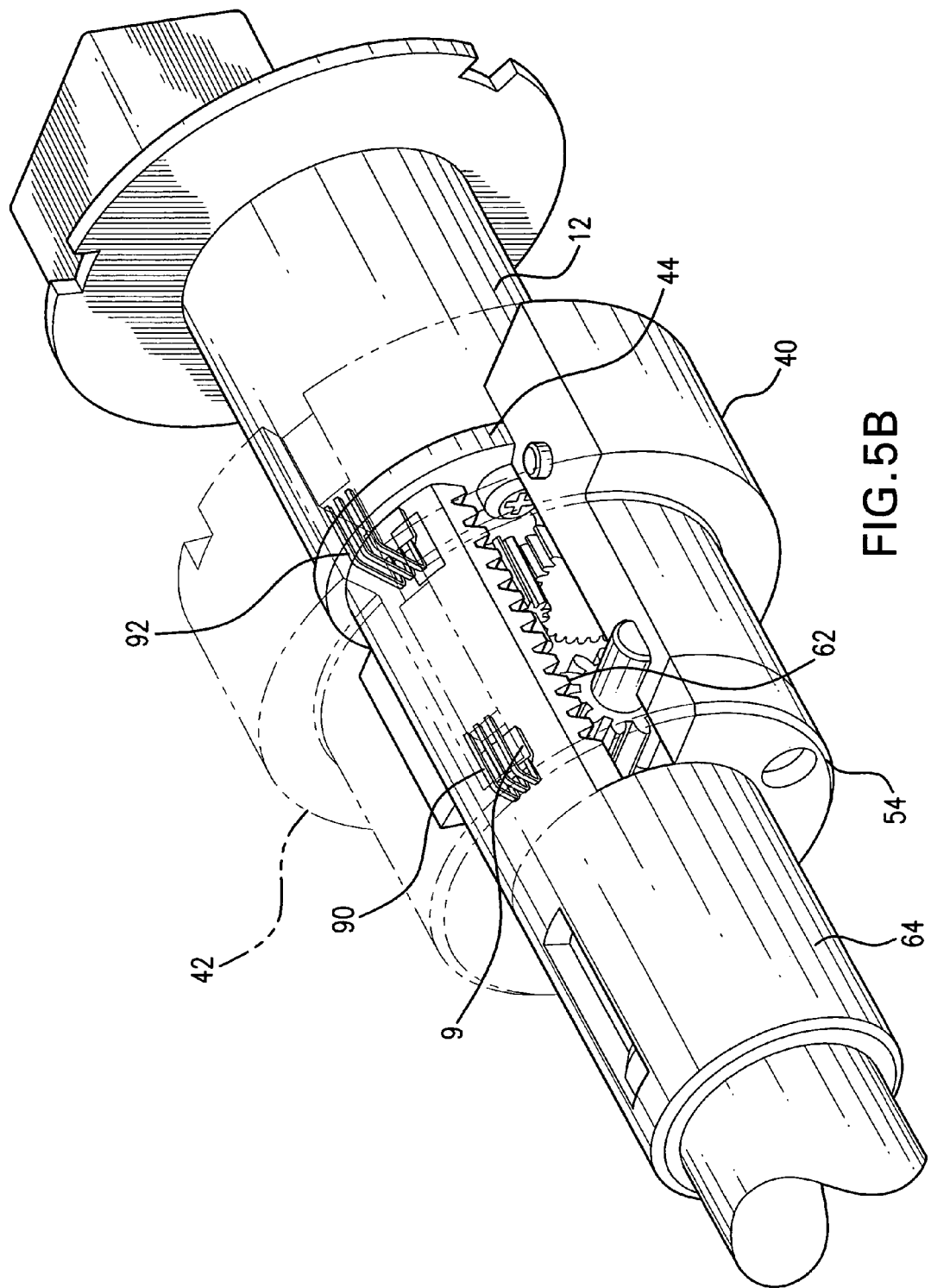
Figure 6:
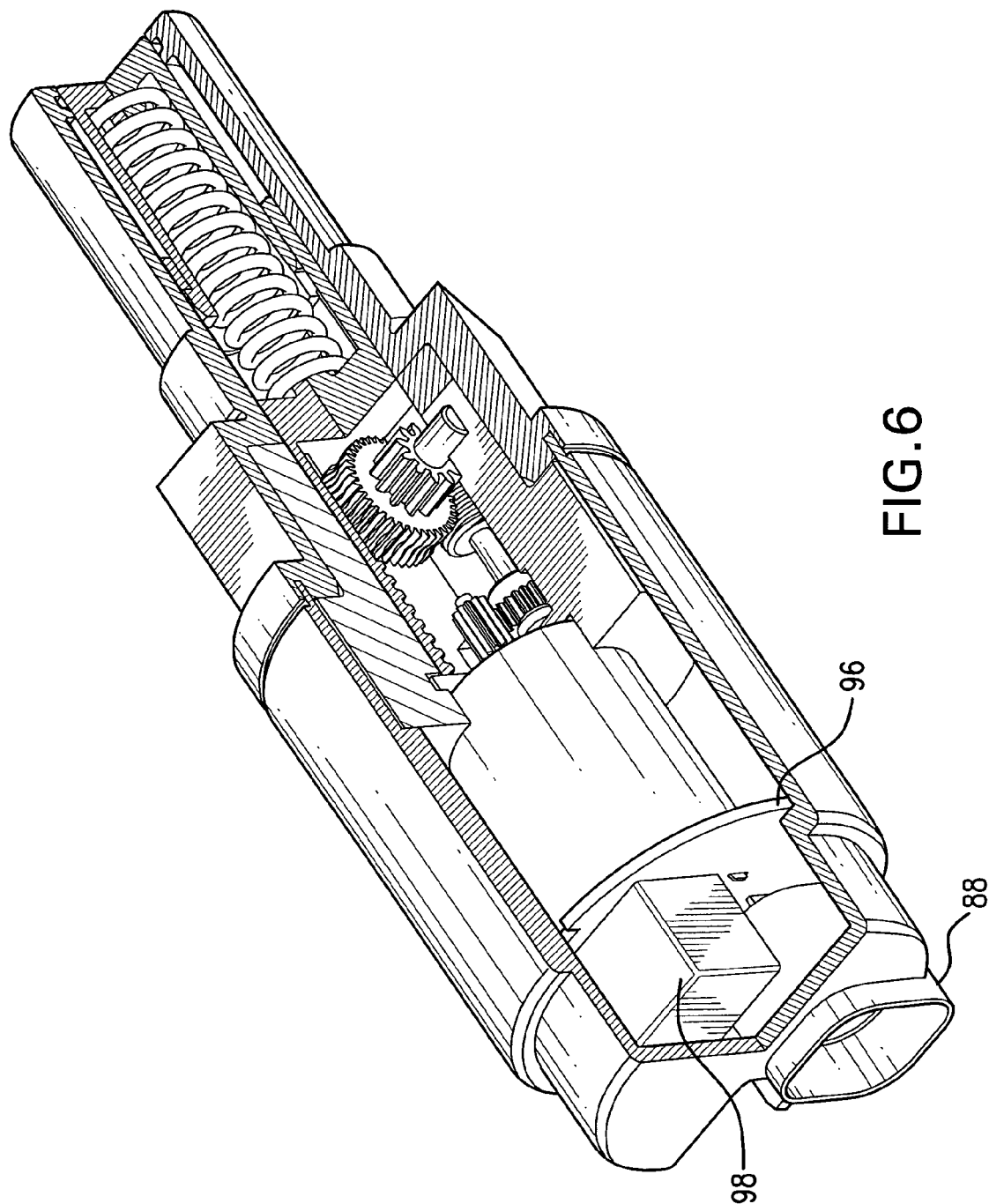
FIG. 6 is a perspective, a partially cut-away view of the actuator embodiment of FIG. 1 viewed from a different direction to illustrate additional elements of the embodiment.

As shown in the view of FIG. 6, the rear end of the housing of the actuator includes an electrical connector 88 with a plurality of electrical terminals. Some of those terminals supply electrical current to the motor 12. An important feature of any such motor-driven actuator is prevention of excessive driving of the motor, for example, by continuing to supply electrical current to the motor after the piston rod 18 has been either fully extended or fully retracted. In the invention, position sensors are employed to sense the retracted and the extended positions of the piston rod 18 and to stop the flow of electrical current to the motor 12 upon sensing the achievement of either position. A position detector embodiment free of any sliding electrical contacts includes two Hall effect sensors 90 and 92 mounted on the outside surface of the upper internal housing portion 42. See FIGS. 5A and 5B. The upper internal housing portion includes respective recesses for receiving the Hall effect sensors and for providing electrical connections to them. (For clarity, the electrical connections within the actuator to the Hall effect sensors and to the motor are not pictorially illustrated.) FIG. 5B indicates the positioning of the Hall effect sensors 90 and 92 in respective recesses of the upper internal housing portion 42, which is shown in phantom lines, and the relationship of the positions of those Hall effect sensors to the piston 64 in the assembled actuator according to one embodiment. A permanent magnet 94 is mounted on the rear portion 68 of the piston 64. The magnet 94 is preferably embedded in the rear portion of the piston, near the free end of the piston. The permanent magnet is preferably mounted flush with the surface of the piston for best interaction with the Hall effect sensors yet without interfering with the movement of the piston. When the piston 64 is in the retracted position, as in FIGS. 1 and 5, that retracted position is detected by the Hall effect sensor 92 because the magnet 94 is directly opposite the Hall effect sensor 92. Likewise, when the piston 64 is in the extended position, as in FIG. 2, the magnet 94 is directly opposite the Hall effect sensor 90, providing an indication of the full extension of the piston rod.

The actuator may contain other electric components of a control circuit. Preferably, an electrical circuit board 96 is included within the housing 10 at the rear end of the electrical motor 12. The circuit board provides a convenient location for making electrical connections between various electrical components of the actuator, including the Hall effect sensors 90 and 92, and the electrical motor 12. On the opposite side of the circuit board 96 from the electrical motor 12, a dual relay 98 is mounted. The relay 98 includes two single-pole double-throw switches. As explained below, this relay effects actuation of the electrical motor 12 for extending or retracting the piston rod 18 and also provides short circuiting of the electrical motor 12 when the Hall effect sensors 90 and 92 detect the arrival of the magnet 94 at the extended or retracted position of the piston rod 18.

Figure 7:
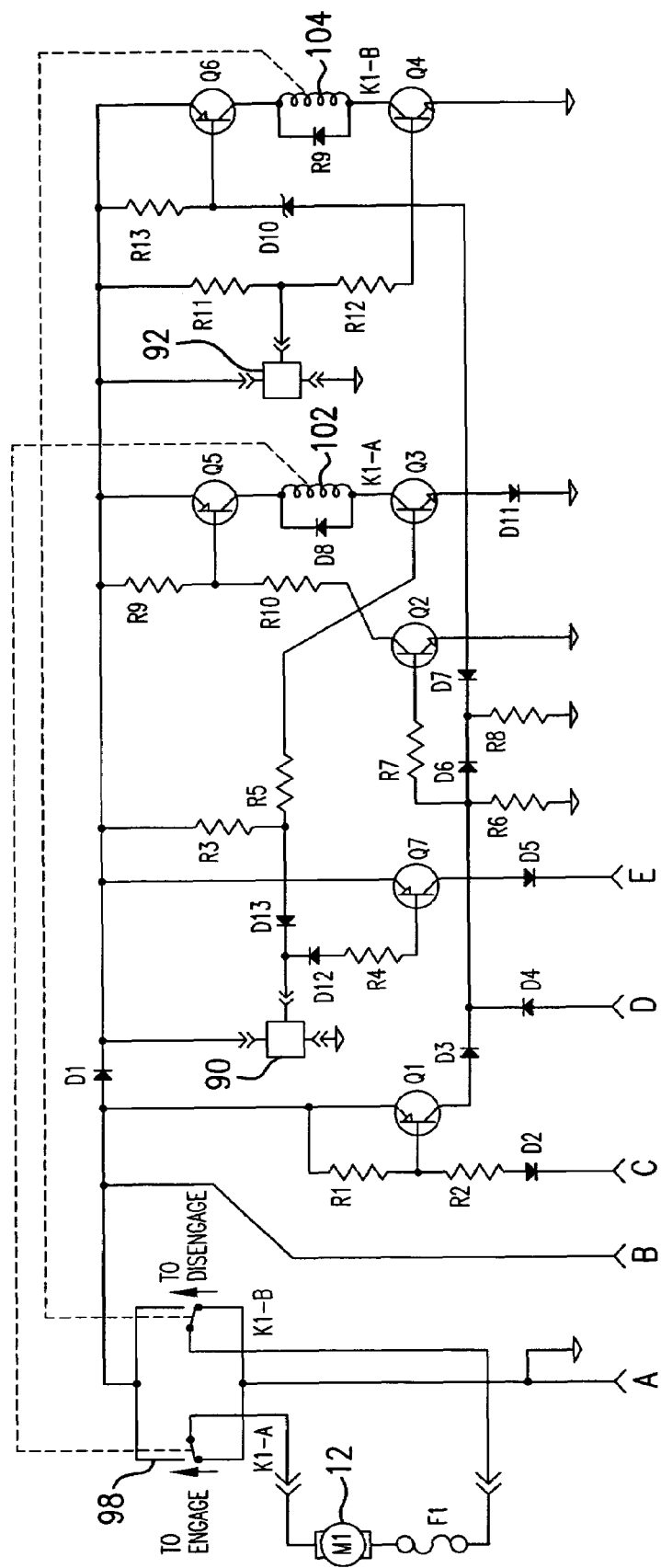
FIG. 7 is an electrical schematic diagram of a circuit that may be employed in the actuator embodiment of FIG. 1.

FIG. 7 is a schematic electrical diagram of the electrical components of the actuator embodiment described. The electrical components of the control circuit, other than the Hall effect sensors, may be mounted on the circuit board 96. The control circuit, other than the Hall effect sensors and the relay, may be an integrated circuit. The illustrated control circuit includes five external terminals, A, B, C, D, and E, to which electrical signals are applied or from which electrical signals are extracted in the operation of the actuator. Although the control circuit of FIG. 7 is shown for purposes of understanding the invention, it is not essential that the control circuit be internal to the actuator. A different connection arrangement may be provided in which the connector of the actuator merely provides electrical access to the terminals of the electrical motor 12 and, if present, to the terminals of the Hall effect sensors 90 and 92. Nevertheless, the circuit of FIG. 7 is described with respect to an embodiment in which the control circuit is internal to the actuator.

With the exception of the dual relay 98 and the Hall effect sensors 90 and 92, all of the elements of the electrical circuit of FIG. 7 are conventional and therefore it is not necessary to describe each of the illustrated elements. The control circuit includes seven transistors, Q1-Q7, all of which function as switching transistors. The pair of switching transistors Q5 and Q3 determines whether current flows through a coil 102 that actuates one switch of the dual relay 98. In other words, transistors Q5 and Q3 must both be conducting in order for current to flow through that coil 102, open the normally closed relay switch contacts, and closes a normally open contact of the relay switch associated with the coil 102. Likewise, the relay includes a second coil 104 and current can only flow through that coil 104 when both of transistors Q4 and Q6 are conducting. The two transistors of each pair (Q3 and Q5, Q4 and Q6) have opposite polarity types. In operation of the actuator, terminal A of the circuit is grounded and terminal B receives the power supply voltage. Terminals C and D are input terminals receiving electrical signals that cause the piston rod to move to the extended position. The proper signal applied to either terminal is sufficient to cause extension of the piston rod and the absence of an extension signal at both of those terminals C and D results in retraction of the piston rod 18. Terminal E is an output terminal that provides a first output signal when the piston rod is in the extended position and a different, second output signal when the piston rod is not in the extended position. The output signal is binary and, of course, in the circuitry of FIG. 7 can be changed so that a desired output state indicates whether the piston rod 18 is extended or not.

When power is applied to one or both of the terminals B and A of the control circuit of FIG. 7, but no signal is applied to terminal C or D for extension of the piston rod, if the Hall effect sensor 92 does not detect the position of the magnet 94 at the retracted position of the piston rod, then both of transistors Q4 and Q6 conduct. The current that flows through the coil 104 actuates the switch of the relay 98 shown to the right within the relay in FIG. 7. The normally closed contacts of the switch open and another circuit closes upon the closing of a normally open contact. The closed circuit supplies power to the electrical motor 12. The polarity of the electrical current supplied causes the motor to turn the shaft 20 in the direction that retracts the piston rod 18 until the Hall effect sensor 92 detects that the magnet 94 is directly opposite that sensor. In this situation, since no extension signal is applied to either of terminals C or D, transistor Q1 does not conduct, with the result that transistor Q2 is likewise non-conducting. Assuming the piston rod 18 is not, at the beginning of this activity in the extended position, the state of the Hall effect sensor 90 causes the transistor Q7 to be non-conducting. Since transistor Q2 does not conduct, transistor Q5 likewise does not conduct. On the other hand, because of the state of the Hall effect sensor 90, the transistor Q3, which is opposite in polarity type from the transistor Q7, is conducting. Likewise, because of the state of the Hall effect sensor 92, the transistor Q4 is conducting. The absence of an input signal at terminals C and D likewise causes the transistor Q6 to conduct so that a current flows through the coil 104, causing actuation of one of the switches of the relay 98, as already described, supplying electrical power to the motor to retract the piston rod. At the end of the movement of the piston rod to the retracted position, the state of the Hall effect sensor 92 changes, switching the transistor Q4 to a non-conducting state so that the current flow through the coil 104 stops. As a result, the single-pole double-throw switch of the right half of the relay 98 of FIG. 7 reverts to its original position, with the normally closed contacts closed, short circuiting, with the other switch of the relay 98, the motor 12. The short-circuiting results in very quick braking, stopping of the rotation of the motor shaft 20.

When the proper signal for extension of the piston rod 18 is applied to either or both of terminals C and D, the control circuit causes the shaft 20 of the motor 12 to rotate in the opposite direction from the retraction direction. The proper signal at terminal D is a "pull up" signal and the proper signal at the terminal C is a "pull down" signal. Transistor Q1 enables the application of either of those two types of signals to the remainder of the circuit. The circuit could be simplified by accepting only one such signal. If a pull down signal is applied to terminal C, then transistor Q1 becomes conducting. If a pull up signal is applied to terminal D, the operation of transistor Q1 is not important. If either of those proper signals is applied, transistor Q2 is biased to conduct, resulting in the conduction of transistor Q5. The state of the Hall effect sensor 90 with the piston rod not fully extended causes the transistor Q3 to conduct. Thus, in this instance, with both transistors Q5 and Q3 conducting, a current flows through the coil 102, actuating the switch shown at the left half of the relay 98 in FIG. 7. The normally closed contacts are opened, and the circuit with the normally open contact is closed. The result is the application of a DC voltage to the electric motor 12 which causes rotation of the shaft 20 in a direction to extend the piston rod 18. Once the Hall effect sensor 90 detects the proximity of the magnet 94, the state of the Hall effect sensor 90 changes so the transistor Q3 is caused to become non-conducting. The current flow through the coil 102 is interrupted, releasing the single-pole double throw switch in the left half of the relay 98 to return to its non-energized position, i.e., the normally closed contacts position. That change in switching position again short-circuits the motor 12, causing abrupt stopping of the motor with the piston rod in the extended position. This change in state of the Hall effect sensor 90 also causes the transistor Q7 to become conducting so that the signal at the terminal E is changed in state and provides an indication that the piston rod has reached and is in the extended position. That signal indicating the extended position is continued to be produced as long as the piston rod is in the extended position, i.e., until the state of the Hall effect sensor 90 changes indicating that the piston rod 18 is not in the extended position.

Finally, it should be apparent from the foregoing description that when no extension signal is present at either terminal C or terminal D, the initially described action occurs, and current flows through the coil 104 due to conducting states of transistors Q4 and Q6, retracting the piston rod until the state of the Hall effect sensor 92 changes.

The position sensor described clearly uses no sliding electrical contacts since proximity sensors are used. This actuator is thereby free of the corrosion, vibration, and cleanliness problems of prior art actuators.

While the foregoing description focuses on a single embodiment of a motor-driven actuator according to the invention, it is not intended to limit the scope of the invention to that particular embodiment. Therefore, the scope of the invention is defined solely by the claims.

The invention claimed is:

1. A motor-driven actuator comprising:
   a housing;
   an electric motor contained within the housing and having a motor shaft rotating about an axis;
   a piston mounted within the housing, in contact with the housing, and slidingly coupled to the housing, wherein the piston includes a tubular front portion, an end wall, and a rear portion extending from the end wall opposite the front portion, the rear portion including a rack;
   a piston rod mounted within the housing, in contact with the housing, slidingly coupled to the housing, and resiliently coupled to the piston for sliding movement of the piston rod relative to the piston, the piston rod being extendable and retractable with respect to the housing;
   a spring disposed at least partially within the tubular front portion of the piston, bearing on the end wall of the piston, and bearing on the piston rod, urging the piston and the piston rod apart from each other;
   a speed-reduction stage including speed reducing gears and a drive shaft, coupled by the speed reducing gears to the motor shaft, and rotating the drive shaft about an axis parallel to the axis of the motor shaft, upon rotation of the motor shaft;
   a speed and direction-change stage coupled to and driven by the drive shaft and rotating a wheel gear about an axis substantially perpendicular to the axis of the motor shaft; and
   a driving stage coupled to and driven by the wheel gear, engaging the piston and sliding the piston within the housing, along a direction parallel to the axis of the motor shaft, to extend and retract the piston rod relative to the housing, along the direction parallel to the axis of the motor shaft.

2. The motor-driven actuator according to claim 1, wherein the speed-reduction stage includes a gear fixedly mounted on the motor shaft and a spur gear mounted on the drive shaft and engaging and driven by the gear mounted on the motor shaft.

3. The motor-driven actuator according to claim 1, wherein the speed and direction-change stage includes a worm gear fixedly mounted on the drive shaft, wherein the rotating wheel gear engages the worm gear.

4. The motor-driven actuator according to claim 1, wherein the driving stage comprises a pinion fixedly mounted to the wheel gear, and engaging the rack for extending and retracting the piston rod along the direction parallel to the axis of the motor shaft, upon rotation of the wheel gear.

5. The motor-driven actuator according to claim 4, including two pinions fixedly mounted to the wheel gear and sandwiching the wheel gear, wherein the rear portion of the piston includes two racks, each rack engaging a respective pinion.

6. The motor-driven actuator according to claim 1, wherein one of the piston and piston rod includes at least one slot extending axially and the other of the piston and piston rod includes at least one projecting tongue, projecting radially from the other of the piston and the piston rod, complementary to and slidably received within the slot, coupling the piston and the piston rod together.

7. The motor-driven actuator according to claim 1, further including a position detector for detecting when the piston rod is in the extended position and when the piston rod is not in the extended position.

8. The motor-driven actuator according to claim 7, wherein the position detector comprises first and second Hall effect sensors fixedly mounted within the housing and a permanent magnet mounted on the piston, the permanent magnet being opposite the first and second Hall effect sensors in the extended position of the piston rod and the retracted position of the piston rod, respectively.

9. The motor-driven actuator according to claim 8, including a control circuit within the housing, the control circuit including the first and second Hall effect sensors and a relay including first and second single-pole double-throw switches having, respectively, first and second coils and responsive to the first and second Hall effect sensors to energize the electric motor to move the piston rod to the extended position and to the retracted position and to short circuit the electric motor when either of the extended and retracted positions is reached by the piston rod.

10. The motor-driven actuator according to claim 9, wherein the control circuit outputs a first signal when the piston rod is in the extended position and a second signal, different from the first signal, when the piston rod is not in the extended position.

11. A motor-driven actuator comprising:
a housing;
an electric motor contained within the housing and having a motor shaft rotating about an axis;
a piston mounted within the housing, in contact with the housing, and slidingly coupled to the housing for moving between first and second positions;
a piston rod mounted within the housing, in contact with the housing, slidingly coupled to the housing, and resiliently coupled to the piston for movement relative to the piston, the piston rod being extendable and retractable with respect to the housing;
a spring bearing on each of the piston and the piston rod, and urging the piston and the piston rod apart from each other, wherein
the piston includes at least one slot extending axially and the piston rod includes at least one projecting tongue, projecting radially from the piston rod, complementary to and slidably received within the slot for engaging the piston, coupling the piston to the piston rod for retracting the piston rod,
the piston pushes the piston rod outward relative to the housing via the spring, when the piston moves from the first position to the second position, and
the piston pulls the piston rod inward relative to the housing via engagement of the piston and the piston rod by the tongue in the slot, when the piston moves from the second position to the first position;
a speed-reduction stage including speed reducing gears and a drive shaft, coupled by the speed reducing gears to the motor shaft, and rotating the drive shaft about an axis parallel to the axis of the motor shaft, upon rotation of the motor shaft;
a speed and direction-change stage coupled to and driven by the drive shaft and rotating a wheel gear about an axis substantially perpendicular to the axis of the motor shaft; and
a driving stage coupled to and driven by the wheel gear and engaging the piston, moving the piston between the first and second positions to extend and retract the piston rod relative to the housing, respectively, along a direction parallel to the axis of the motor shaft.

12. The motor-driven actuator according to claim 11, wherein the speed-reduction stage includes a gear fixedly mounted on the motor shaft and a spur gear mounted on the drive shaft and engaging and driven by the gear mounted on the motor shaft.

13. The motor-driven actuator according to claim 11, wherein the speed and direction-change stage includes a worm gear fixedly mounted on the drive shaft, wherein the rotating wheel gear engages the worm gear.

14. The motor-driven actuator according to claim 11, wherein the driving stage comprises a pinion fixedly mounted to the wheel gear, and the piston includes a rack engaging the pinion for extending and retracting the piston rod along the direction parallel to the axis of the motor shaft, upon rotation of the wheel gear.

15. The motor-driven actuator according to claim 14, including two pinions fixedly mounted to the wheel gear and sandwiching the wheel gear, wherein the piston includes two racks, each rack engaging a respective pinion.

16. The motor-driven actuator according to claim 11, further including a position detector for detecting when the piston rod is in the extended position and when the piston rod is not in the extended position.

17. The motor-driven actuator according to claim 16, wherein the position detector comprises first and second Hall effect sensors fixedly mounted within the housing and a permanent magnet mounted on the piston, the permanent magnet being opposite the first and second Hall effect sensors in the extended position of the piston rod and the retracted position of the piston rod, respectively.

18. The motor-driven actuator according to claim 17, including a control circuit within the housing, the control circuit including the first and second Hall effect sensors and a relay including first and second single-pole double-throw switches having, respectively, first and second coils and responsive to the first and second Hall effect sensors to energize the electric motor to move the piston rod to the extended position and to the retracted position and to short circuit the electric motor when either of the extended and retracted positions is reached by the piston rod.

19. The motor-driven actuator according to claim 18, wherein the control circuit outputs a first signal when the piston rod is in the extended position and a second signal, different from the first signal, when the piston rod is not in the extended position.

* * * * *